Figures 1, 2:
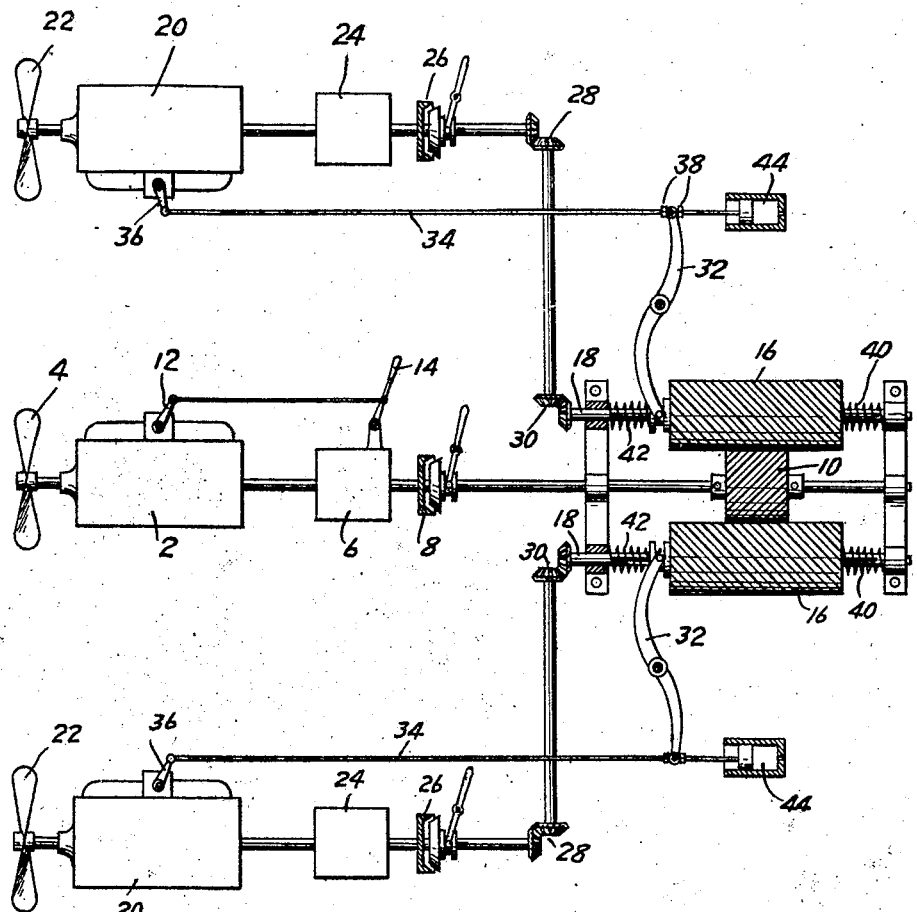

Jan. 5, 1943.   J. E. PEEK   2,307,334
SYNCHRONIZING DEVICE
Filed March 21, 1940

WITNESS:

INVENTOR
Jesse Eldon Peek
BY
ATTORNEYS.

Patented Jan. 5, 1943

2,307,334

UNITED STATES PATENT OFFICE 2,307,334

SYNCHRONIZING DEVICE

Jesse Eldon Peek, Oklahoma City, Okla.

Application March 21, 1940, Serial No. 325,149

2 Claims. (Cl. 60—97)

This invention relates to a synchronizing device, particularly adapted to the synchronizing of prime movers the speed of one of which may be manually varied and the speed of the other of which should be varied automatically to correspond. The invention is particularly adapted for the synchronizing of propeller driving engines in aircraft.

For the proper operation of aircraft having a plurality of propellers, it is essential that the propellers be under close control so that the thrusts produced may be either equal or properly related to each other. In the case of an airplane having three propellers, for example, it is generally essential that the outer propellers be driven at the same rate, while the central propeller may be driven at either the same or some related rate, depending upon whether or not it is of the same size and pitch as the others.

The general object of the present invention is to provide a simple synchronizing arrangement for the automatic control of the relative speeds of prime movers and specifically of such nature that the number of revolutions are under such close control that variations of the total number of revolutions beyond a particular amount is impossible.

The above object and other objects of the invention, particularly relating to details, will become apparent from the following description, read in conjunction with the accompanying drawing in which:

Figure 1 is a diagrammatic view illustrating a preferred form of the synchronizing arrangement with the parts conventionalized and not to scale; and Figure 2 is a fragmentary diagrammatic view illustrating a modification.

Referring first to Figure 1, there is disclosed therein an internal combustion engine 2 driving a propeller 4 and, through reduction gearing 6 and a clutch 8, a spiral gear 10. The speed of the engine 2 may be manually controlled by means of a throttle 12 subject to manipulation by the operator. The spiral gear 10 meshes with a plurality of elongated spiral gears 16, which are similarly connected for the control of another pair of engines 20, arranged to drive propellers 22. Since the arrangements are identical, only one need be described in detail. Each spiral gear 16 is splined to a shaft 18 so as to be movable axially along its shaft, which is parallel to the shaft of the spiral gear 10. An engine 20 drives through reduction gearing 24 and a suitable clutch 26 connections 28 and 30 to the shaft 18. These connections have been conventionalized in the figure, but it will be understood that flexible shafting or the like may be provided. Since these connections need not transmit any appreciable power, it will be evident that they may be readily run to a remote position of the spiral gear arrangement. The entire spiral gear assembly including clutches 8, 26 and 30, may be quite small and may form a compact unit adjacent the operator's position, for example, on an instrument panel.

Each spiral gear 16 in its axial movements is adapted through the medium of a collar and pin connection to rock a lever 32, connected through a link 34 to the throttle 36 of the corresponding engine 20. Initial adjustments may be effected by nuts 38 threaded on the link 34. A dash pot 44 is provided to stabilize the operation and prevent hunting. Springs 40 and 42 normally tend to urge the spiral gear 16 to a central position. It will be evident that these springs may be located in some other part of the connections to effect the same result. The springs maintain the gears in centrally meshed condition when the clutches are disengaged so that when the control mechanism is brought into operation variations are about said central positions.

The operation of the arrangement will be readily apparent. The connections are so made that if, with the engine 2 running at a certain speed determined by manual control of its throttle, one of the engines 20 varies from such speed, its corresponding gear 16 will tend to rotate faster or slower than the proper speed determined by the meshing of it with the controlling gear 10. As a result of the presence of the spiral teeth, an end thrust will be set up to move the lever 32 and so adjust the throttle 36 of the engine 20 to cause it to speed up or slow down to synchronism with the engine 2. As indicated above, the arrangement does not require that the engines operate at the same speed. If particular different speed ratios are required, this is taken care of by different gear ratios in the reduction gear boxes 6 and 24. It will be evident in connection with this modification that the presence of reduction gearing is essential, inasmuch as if it were not present a difference of one revolution would cause an excessive movement of the spiral gears relative to each other. It will be evident that the control of the two engines 20 from the single gear 10 may be effected without the operation of one interfering with the other. Under normal conditions, it will be clear that an equilibrium condition will be reached aided by suitable damping through the medium of the dash pots so that synchronism is accurately obtained. The total number of revolutions of the engine 20 cannot differ by more than a predetermined amount from a corresponding number of revolutions of the engine 2.

While there is illustrated one internal combustion engine controlling two others, obviously two internal combustion engines may be maintained in synchronism by using only one gear 16 in mesh with a spiral gear 10. Alternatively, a larger number may be controlled by duplication of the arrangement illustrated.

It is not necessary that the controlling gear 10 be driven from an internal combustion engine. Instead, it may be driven by some small prime mover, such as a small electric motor, the speed of which is subject to control. Thus engines such as those illustrated at 20 may be be kept in synchronism with each other and with any suitable prime mover. The control is adapted not only for internal combustion engines, since it will be obvious that the lever 32 may well control a rheostat to adjust the speed of an electric motor or to adjust inlet of fluid to a steam or liquid turbine.

The principles of the invention may be embodied in other fashions, for example as illustrated in Figure 2, in which a shaft 48 corresponds to the shaft driven by the controlling prime mover and has mounted on it a spur gear 46 corresponding to the gear 10 in determining the speed of operation. Meshing with the gear 46 is an elongated spur gear 50, which is internally threaded to serve as a nut upon the threaded portion 52 of a shaft 54 connected to the prime mover the speed of which is to be controlled. The gear 50 carries a collar which controls a lever 56, corresponding to lever 32. It will be evident here again that if the speed of the shaft 54 rises or falls with respect to the normal speed corresponding to that of shaft 48, a lengthwise movement of the gear 50 will result to effect control of the prime mover driving the shaft 54. If a fine thread is used at 52, reduction gearing such as 6 and 24 may be avoided, since the axial movements of the gear 50 will be relatively slow. The use of a dash pot may also be avoided in such case, since the arrangement can be made of dead beat character.

In both of the arrangements illustrated, it is desirable for safety purposes to so arrange the mechanism that in the event of stoppage of any of the prime movers the gears may move entirely out of mesh or may become entirely disconnected from one of the driving shafts. In starting up the system, it is, of course, necessary that approximate synchronism of speeds be obtained before the various elements are thrown into connection by manipulation of the clutches.

It will be clear that the invention may be embodied in other modifications without departing from the scope of the invention as defined in the following claims.

What I claim and desire to protect by Letters Patent is:

1. In combination, a variable speed prime mover, a gear driven by said prime mover, a second prime mover, a second gear meshing with the first gear and arranged to be driven by the second prime mover, clutching means between said second gear and said second prime mover, means mounting said gears for relative axial movement upon occurrence of differences in their driving speeds, and means for varying the speed of said second prime mover responsive to said relative axial movement of the gears, and spring means for urging at least one of said gears toward a mean relationship of the gears when said one gear is declutched.

2. In combination, a variable speed prime mover, a gear driven by said prime mover, a second prime mover, a second gear meshing with the first gear and arranged to be driven by the second prime mover, clutching means between one of said gears and its prime mover, means mounting said gears for relative axial movement upon occurrence of differences in their driving speeds, and means for varying the speed of said second prime mover responsive to said relative axial movement of the gears, and spring means for urging at least one of said gears toward a mean relationship of the gears when said one gear is declutched.

JESSE ELDON PEEK.